United States Patent
Itoh

(10) Patent No.: US 12,191,786 B2
(45) Date of Patent: Jan. 7, 2025

(54) MOTOR CONTROL APPARATUS AND IMAGE FORMING APPARATUS HAVING PLURALITY OF ACTIVATION MODES

(71) Applicant: CANON KABUSHIKI KAISHA, Tokyo (JP)

(72) Inventor: Masatoshi Itoh, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 204 days.

(21) Appl. No.: 18/146,650

(22) Filed: Dec. 27, 2022

(65) Prior Publication Data
US 2023/0238907 A1    Jul. 27, 2023

(30) Foreign Application Priority Data

Jan. 26, 2022  (JP) .................................. 2022-010360

(51) Int. Cl.
*H02P 21/22*   (2016.01)
*G03G 15/20*   (2006.01)
*H02P 23/20*   (2016.01)

(52) U.S. Cl.
CPC .......... *H02P 23/20* (2016.02); *G03G 15/2039* (2013.01)

(58) Field of Classification Search
CPC ...... H02P 21/22; H02P 23/20; G03G 15/2039
See application file for complete search history.

(56) References Cited

U.S. PATENT DOCUMENTS

| | | |
|---|---|---|
| 2007/0040530 A1 | 2/2007 | Ryuzaki |
| 2013/0214025 A1* | 8/2013 | Zemlok ............ A61B 17/07207 |
| | | 227/175.1 |
| 2015/0145454 A1 | 5/2015 | Kameyama |
| 2018/0208286 A1* | 7/2018 | MacFarlane ............ B63B 32/10 |
| 2024/0063732 A1* | 2/2024 | Nair ........................ H02P 21/22 |

FOREIGN PATENT DOCUMENTS

| | | |
|---|---|---|
| JP | H08223970 A | 8/1996 |
| JP | 2001235975 A | 8/2001 |
| JP | 2003039942 A | 2/2003 |
| JP | 2007052200 A | 3/2007 |

* cited by examiner

*Primary Examiner* — Cortez M Cook
(74) *Attorney, Agent, or Firm* — ROSSI, KIMMS & McDOWELL LLP

(57) ABSTRACT

A motor control apparatus includes: a motor configured to drive a load; and a control unit configured to control the motor. The control unit is configured to, when activating the motor, determine whether a predetermined condition for determining that fluctuation in magnitude of the load occurs is satisfied, activate the motor in a first mode when the predetermined condition is satisfied, and activate the motor in a second mode when the predetermined condition is not satisfied, and the first mode is a mode in which an increase in rotation speed of the motor is gentler than an increase in rotation speed of the motor in the second mode.

19 Claims, 11 Drawing Sheets

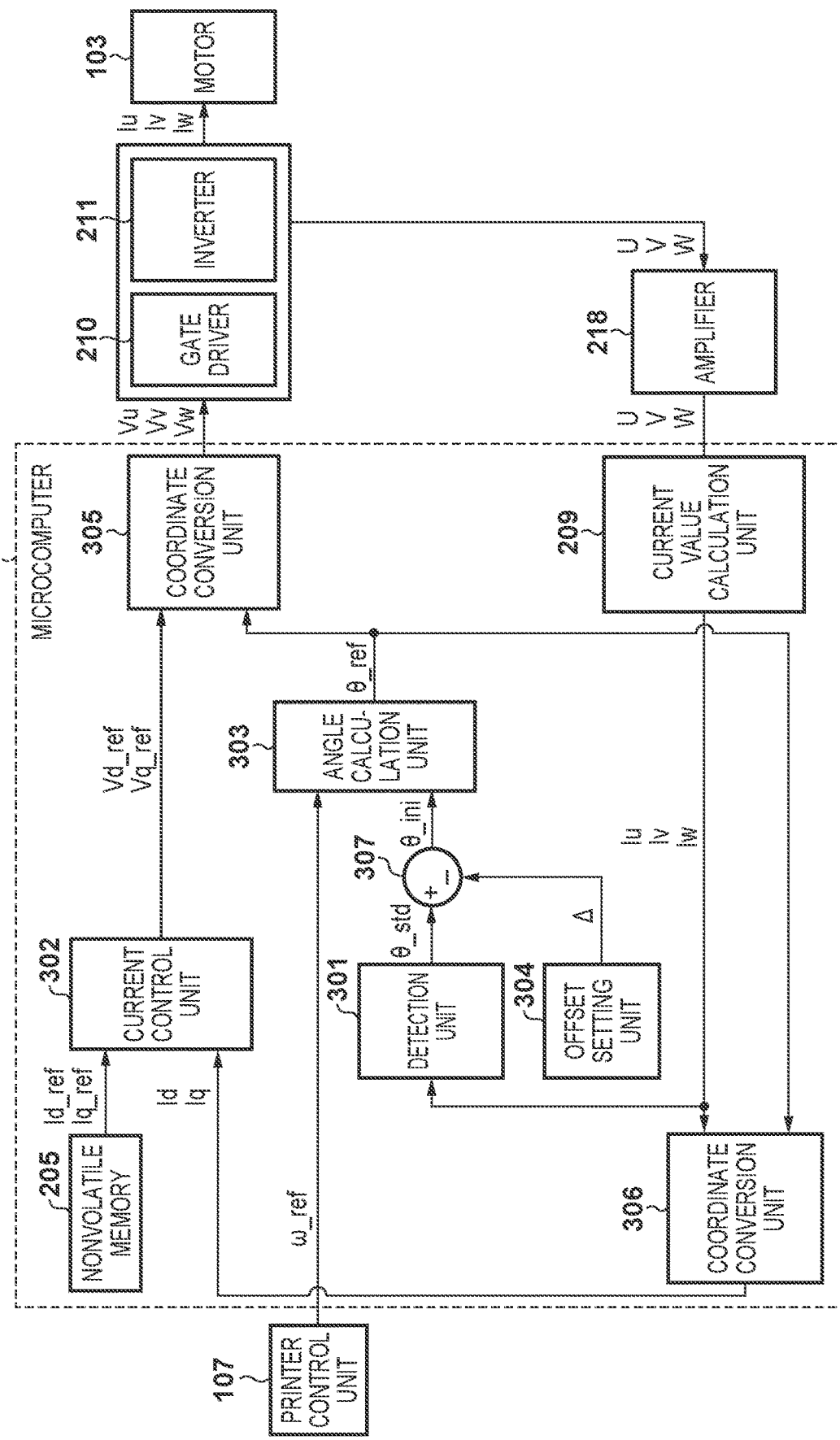
F I G. 4

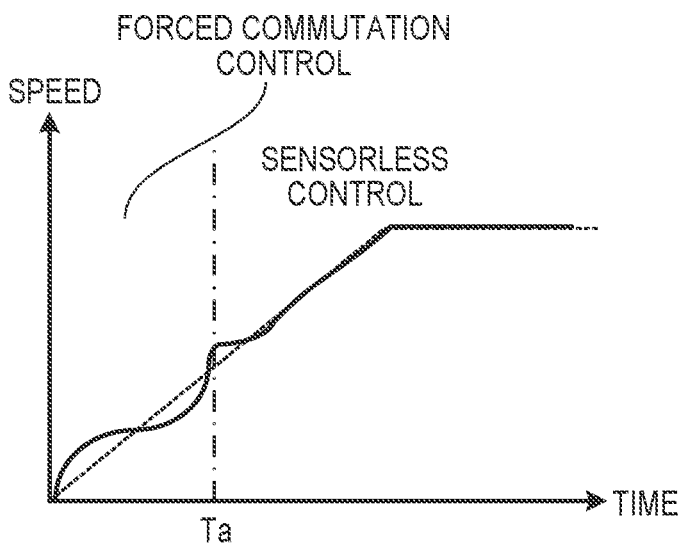
FIG. 6A
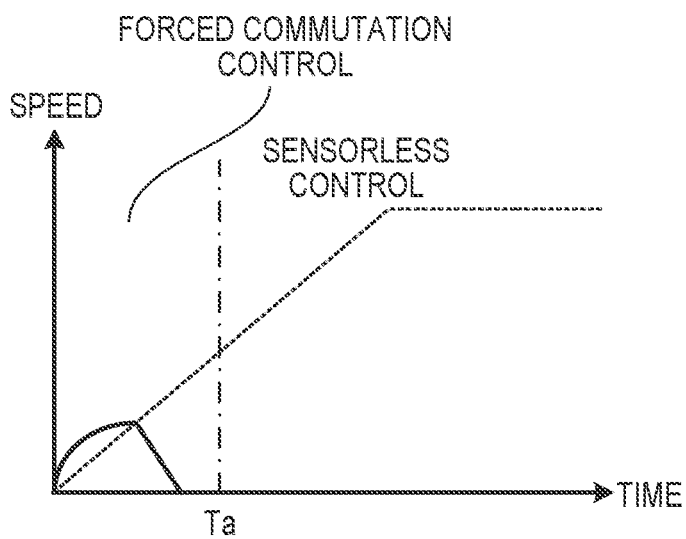
FIG. 6B
FIG. 6C
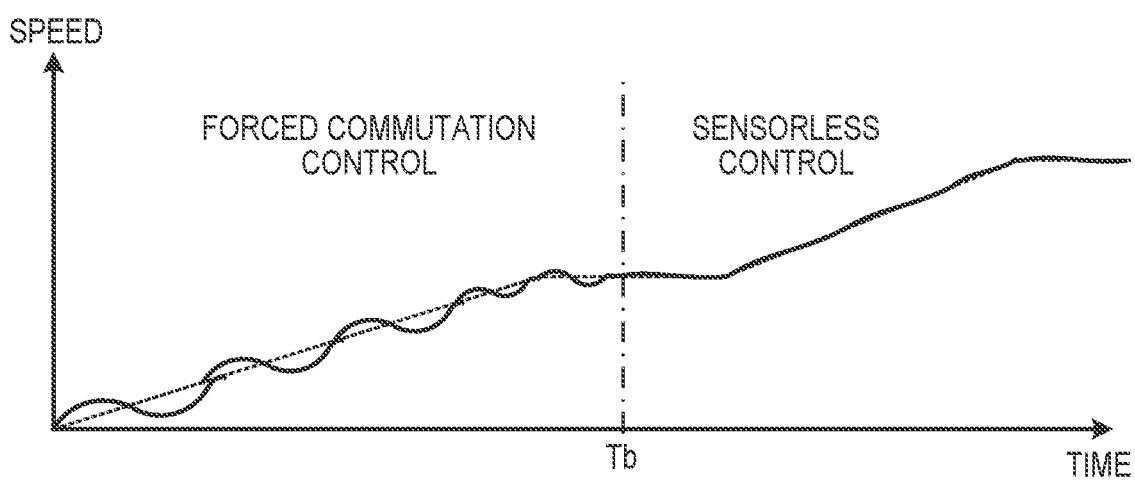

| STATE | ACTIVATION MODE |
|---|---|
| AFTER LEFT FOR PREDETERMINED TIME | HIGH TORQUE MODE |
| WHEN REPLACING CARTRIDGE | HIGH TORQUE MODE |
| ... | HIGH TORQUE MODE |
| OTHER THAN ABOVE | NORMAL MODE |

MOTOR CONTROL APPARATUS AND IMAGE FORMING APPARATUS HAVING PLURALITY OF ACTIVATION MODES

BACKGROUND OF THE INVENTION

Field of the Invention

The present invention relates to control technology for a motor.

Description of the Related Art

A sensorless type motor (hereinafter, referred to as sensorless motor), which is not equipped with a sensor that detects a rotation position (rotation phase) of a rotor, has been used as a drive source of an image forming apparatus. The motor control apparatus that controls a sensorless motor first detects a stop position of a rotor (rotation phase of a rotor that is stopped) by a predetermined method in activation of the motor. US-2015-0145454 discloses a configuration for detecting a stop position of a rotor by using a characteristic that an inductance value of a coil of a motor changes according to the stop position of the rotor. The motor control apparatus starts driving of the motor by forced commutation control, based on the stop position detected of the rotor. When the rotation speed of the rotor becomes equal to or higher than a predetermined speed, as described in Japanese Patent Laid-Open No. 8-223970, the motor control apparatus can detect the rotation position and the rotation speed of the rotor by an induced voltage generated in a coil. Therefore, after the rotation speed of the rotor becomes equal to or higher than the predetermined speed, the motor control apparatus switches the control method from the forced commutation control to the sensorless control in which the rotation of the rotor is controlled based on the induced voltage generated in the coil.

The load of the motor may vary for a variety of reasons. For example, assume that the load is a photoreceptor. In this case, the load may fluctuate depending on the frictional state between the photoreceptor and the cleaning blade that removes the remaining toner on the photoreceptor. When the load is replaced, the load may fluctuate before and after the replacement. In the forced commutation control, since the motor is controlled using a predetermined current value, an activation failure such as step-out may occur when load torque is heavier than the output torque obtained at the predetermined current value.

SUMMARY OF THE INVENTION

According to an aspect of the present invention, a motor control apparatus includes: a motor configured to drive a load; and a control unit configured to control the motor, wherein the control unit is configured to, when activating the motor, determine whether a predetermined condition for determining that fluctuation in magnitude of the load occurs is satisfied, activate the motor in a first mode when the predetermined condition is satisfied, and activate the motor in a second mode when the predetermined condition is not satisfied, and the first mode is a mode in which an increase in rotation speed of the motor is gentler than an increase in rotation speed of the motor in the second mode.

Further features of the present invention will become apparent from the following description of exemplary embodiments with reference to the attached drawings.

BRIEF DESCRIPTION OF THE DRAWINGS

FIG. 4 is a functional block diagram of a microcomputer in forced commutation control according to an embodiment.

FIGS. 6A to 6C are explanatory diagrams of a motor activation method according to an embodiment.

DESCRIPTION OF THE EMBODIMENTS

Figure 1:
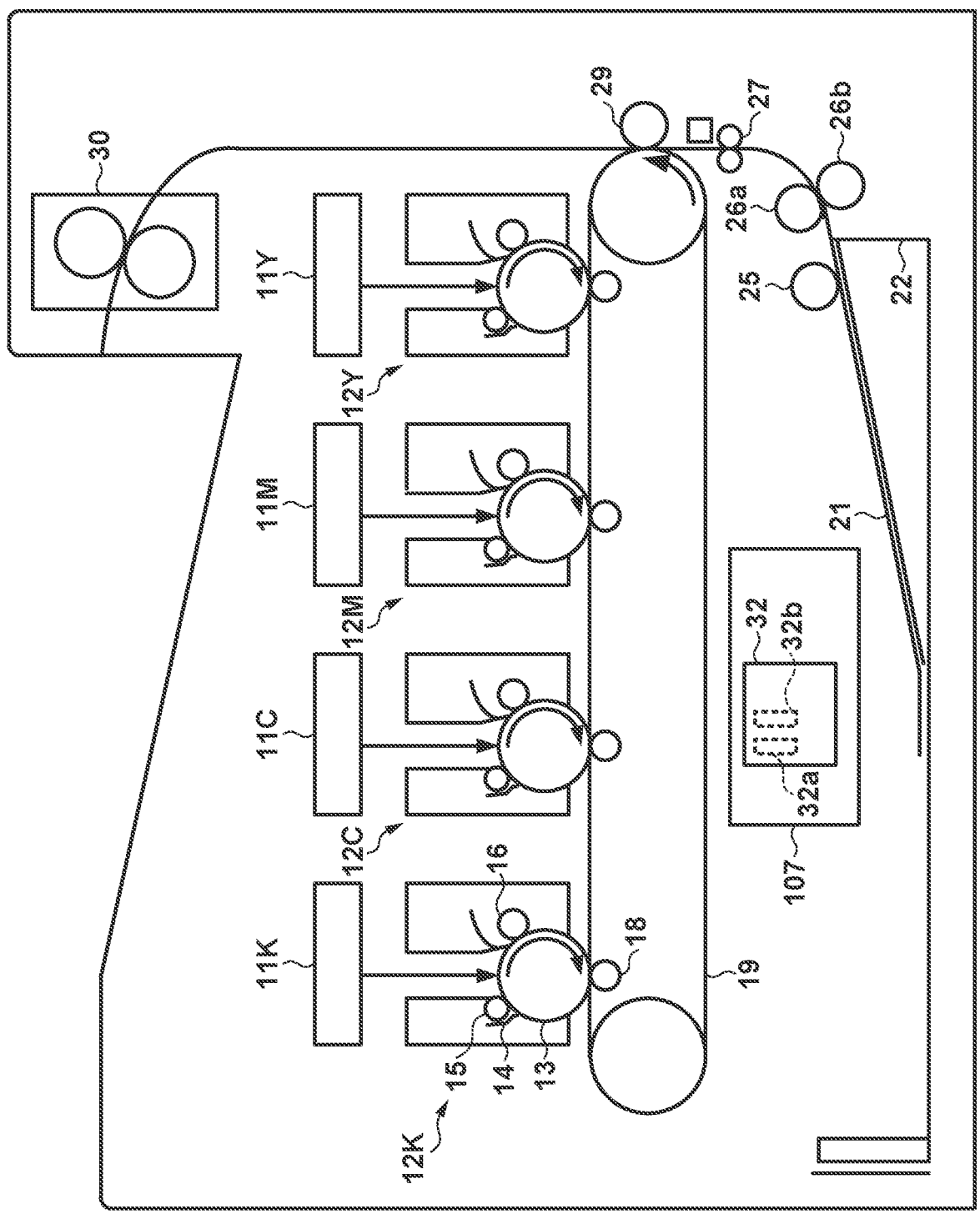
FIG. 1 is a configuration diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of a tandem type color image forming apparatus using an electrophotographic process according to the present embodiment. In FIG. 1, the letters Y, M, C, and K at the end of the reference numerals indicate that the colors of the toner images related to formation by the members indicated by the reference numerals are yellow, magenta, cyan, and black, respectively. In a case where it is not necessary to distinguish the color of the toner image of which the member is involved in formation, reference numerals are used with the last characters omitted. The image forming apparatus includes cartridges 12. Each cartridge 12 is a replacement part of the image forming apparatus, and is configured to be detachable from the body of the image forming apparatus. The configuration of each cartridge 12 is similar, and includes a photoreceptor 13, a charging roller 15, a developing roller 16, and a cleaning blade 14, and contains toner of corresponding color.

The photoreceptor 13 is rotationally driven clockwise in the drawing at the time of image formation. The charging roller 15 charges a surface of the corresponding photoreceptor 13. A scanning unit 11 scans and exposes the surface of the photoreceptor 13 of the corresponding cartridge 12 with light based on image data to form an electrostatic latent image on the photoreceptor 13. By outputting a developing voltage, the developing roller 16 develops the electrostatic latent image on the corresponding photoreceptor 13 with toner, thereby forming a toner image on the corresponding photoreceptor 13. A primary transfer roller 18 outputs primary transfer voltage to transfer the toner image of the corresponding photoreceptor 13 to an intermediate transfer belt 19. The cleaning blade 14 removes the toner that is not transferred to the intermediate transfer belt 19 and is remaining on the photoreceptor 13. Colors different from yellow, magenta, cyan, and black can be reproduced by superimposing and transferring the toner image of the photoreceptor 13 of each cartridge 12 on the intermediate transfer belt 19. The intermediate transfer belt 19 is rotationally driven counterclockwise in the drawing at the time of image formation. Due to this, the toner image on the intermediate transfer belt 19 is conveyed to an opposing position of a secondary transfer roller 29.

On the other hand, a sheet 21 stored in a cassette 22 is fed to a conveyance path by a feeding roller 25. Separation rollers 26a and 26b are provided in order to prevent double feeding of a sheet. The sheet 21 fed to the conveyance path is conveyed to an opposing position of the secondary transfer roller 29 by a registration roller 27. By outputting a secondary transfer voltage, the secondary transfer roller 29 transfers the toner image on the intermediate transfer belt 19 to the sheet 21. Thereafter, the sheet 21 is conveyed to a fixing unit 30. The fixing unit 30 includes a pressurizing roller and a heating roller (heating film), and fixes the toner image to the sheet 21 by pressurizing and heating the sheet 21. After fixing the toner image, the sheet 21 is discharged to the outside of the image forming apparatus.

A printer control unit 107 includes a central processing unit (CPU) 32 and controls the entire image forming apparatus. The printer control unit 107 includes a nonvolatile memory 32a that stores a control program executed by the CPU 32, control data used by the CPU 32 in controlling the image forming apparatus, and the like. The printer control unit 107 includes a volatile memory 32b used as a work area by the CPU 32 when the CPU 32 controls the image forming apparatus. The image forming apparatus includes one or more sensorless motors (not illustrated in FIG. 1) configured to drive rollers and the like, which convey the sheet 21, such as the photoreceptor 13, the intermediate transfer belt 19, the developing roller 16, the pressurizing roller of the fixing unit 30, and the registration roller 27. In the following description, the sensorless motor is simply referred to as "motor".

Figure 2:
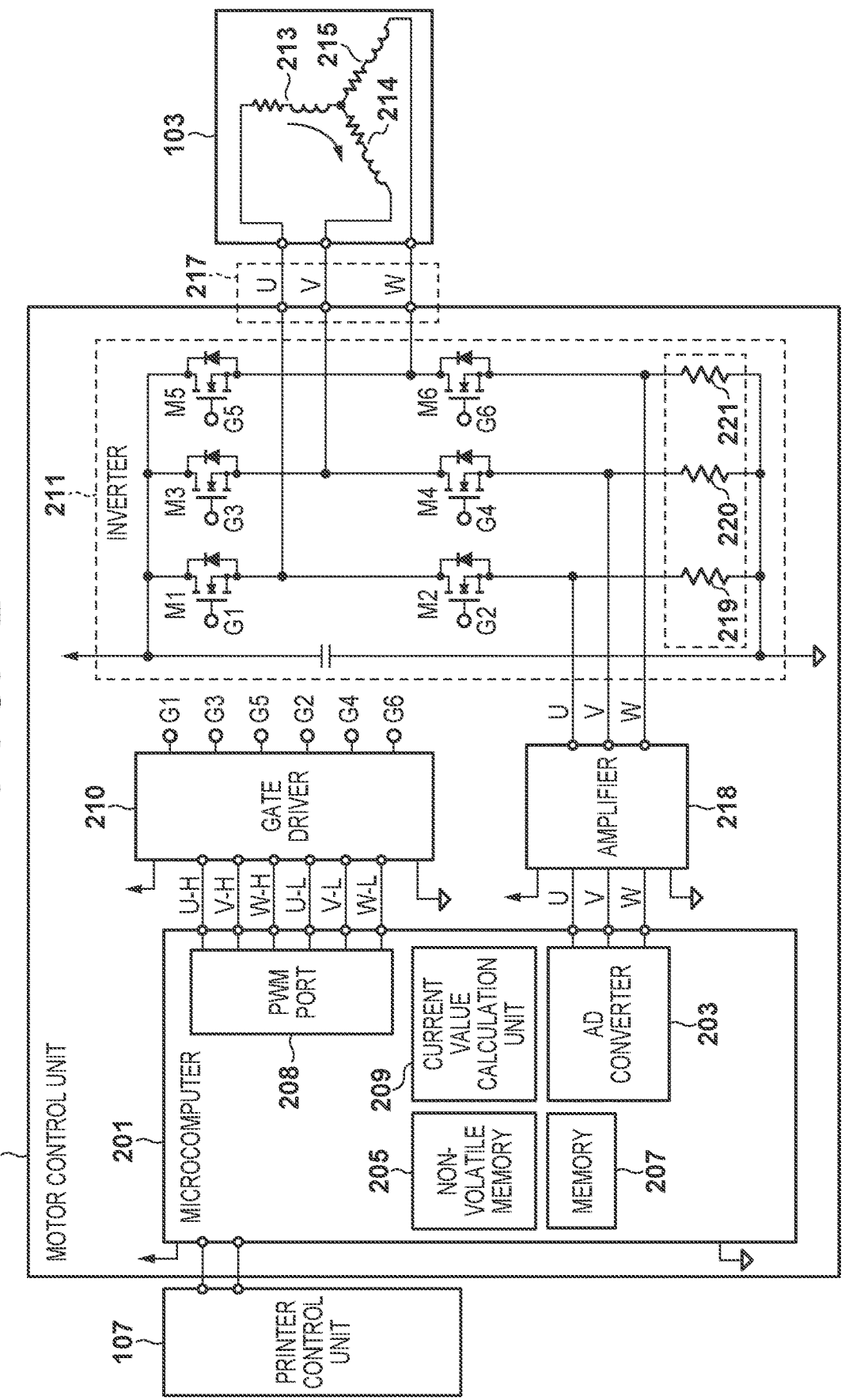
FIG. 2 is a configuration diagram of a motor control unit according to an embodiment.

FIG. 2 illustrates the control configuration of a motor 103 provided in the image forming apparatus. The motor control unit 110 communicates with the printer control unit 107 and controls the motor 103 under control of the printer control unit 107. A nonvolatile memory 205 of a microcomputer 201 stores a program executed by the microcomputer 201 and various kinds of data used for control of the motor 103. The memory 207 is used by the microcomputer 201 for temporary data storage. A PWM port 208 includes a total of six terminals configured to output two PWM signals (high side and low side) with respect to each of three phases (U, V, and W) of the motor 103. That is, the PWM port 208 includes three terminals of the high side (U-H, V-H, and W-H) and three terminals of the low side (U-L, V-L, and W-L).

An inverter 211 includes switching elements M1, M3, and M5 of the high side and switching elements M2, M4, and M6 of the low side, for each of the three phases of the motor 103. In FIGS. 2, M1 and M2 are U-phase switching elements, M3 and M4 are V-phase switching elements, and M5 and M6 are W-phase switching elements. As the switching element, for instance, a transistor or an FET can be used. A gate driver 210 controls ON/OFF of the corresponding switching element, based on the PWM signal from the PWM port 208. For instance, the gate driver 210 controls ON/OFF of the switching element M1 by controlling applied voltage to a gate G1 of the switching element M1, based on the PWM signal output from the U-H terminal.

U-, V-, and W-phase outputs 217 of the inverter 211 are connected to coils 213 (U-phase), 214 (V-phase), and 215 (W-phase) of the motor 103. Coil current flowing through each of the coils 213, 214, and 215 can be controlled by controlling ON/OFF of each of the switching elements. In this manner, the inverter 211 functions as a current supply unit that supplies the coil current to each of the coils 213, 214, and 215. The coil current flowing through each of the coils 213, 214, and 215 is converted into voltage by current detection resistors 219, 220, and 221. An amplifier 218 amplifies the voltage of the current detection resistors 219, 220, and 221 corresponding to the coil current, and outputs amplified voltage to an AD converter 203 of the microcomputer 201. The AD converter 203 converts the voltage output by the amplifier 218 into a digital value. A current value calculation unit 209 determines the current value of the coil current of each phase based on the digital value output from the AD converter 203.

Figure 3:
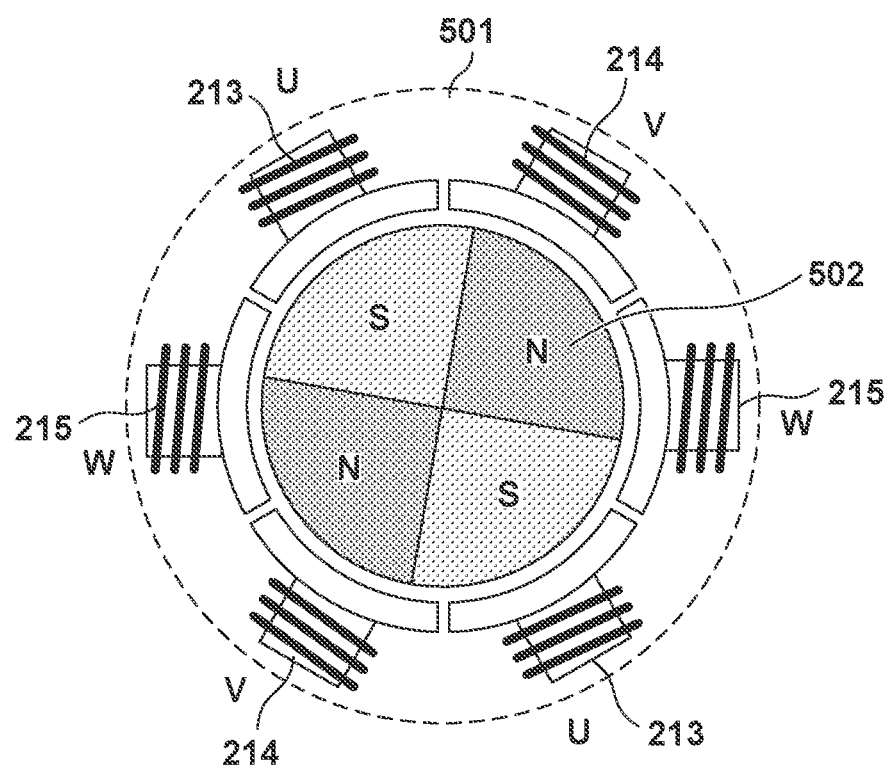
FIG. 3 is a configuration diagram of a motor according to an embodiment.

FIG. 3 is a configuration diagram of the motor 103. The motor 103 includes a stator 501 including six slots, and a rotor 502 including four poles. The stator 501 includes a U-phase coil 213, a V-phase coil 214, and a W-phase coil 215. The rotor 502 is constituted by a permanent magnet. A rotation phase of the rotor 502 is defined based on a case where the rotor 502 is in a predetermined state. As an example, as illustrated in FIG. 3, with reference to a state in which the S pole of the rotor 502 faces the U-phase coil 213, that is, as an electric angle is 0, the rotation phase is defined that an electric angle will increase in counterclockwise. In the present embodiment, since the number of the poles of the rotor 502 is four, in a case where the rotor rotates counterclockwise by a mechanical angle of $\pi/2$ from the state of FIG. 3, an electric angle becomes $\pi$.

FIG. 4 is a functional block diagram of the microcomputer 201 in forced commutation control. Note that in the present embodiment, the microcomputer 201 vector-controls the motor 103. A current control unit 302 acquires a command value Id_ref of excitation current and a command value Iq_ref of torque current that are stored in advance in the nonvolatile memory 205. Additionally, a measurement value Id of excitation current and a measurement value Iq of torque current are input from a coordinate conversion unit 306 to the current control unit 302. Note that the excitation current refers to a component in coil current that contributes to generation of a magnetic flux, and the torque current refers to a component in coil current that contributes to output torque. Based on these values, the current control unit 302 outputs voltage command values Vd_ref and Vq_ref in a rotating coordinate system. A coordinate conversion unit 305 performs coordinate conversion from the rotating coordinate system into a static coordinate system, and further performs two-phase-to-three-phase conversion, and thus generates voltage command values Vu, Vv, and Vw of the U phase, the V phase, and the W phase from the voltage command values Vd_ref and Vq_ref, and outputs the voltage command values Vu, Vv, and Vw. The coordinate conversion from the rotating coordinate system to the static coordinate system is performed based on an electric angle $\theta$_ref output from an angle calculation unit 303. The microcomputer 201 generates the PWM signal to be output to the gate driver 210, based on the voltage command values Vu, Vv, and Vw.

Additionally, current values Iu, Iv, and Iw of U-phase, V-phase, and W-phase coil current detected based on the output of the amplifier 218 by the current value calculation unit 209 are input to the coordinate conversion unit 306. The coordinate conversion unit 306 converts the current values Iu, Iv, and Iw into current values in the static coordinate system by three-phase-to-two-phase conversion, and further performs coordinate conversion from the static coordinate system into the rotating coordinate system, and thus obtains the measurement value Id of excitation current and the measurement value Iq of torque current. The coordinate conversion from the static coordinate system to the rotating coordinate system is performed based on the electric angle θ_ref output from the angle calculation unit 303. The coordinate conversion unit 306 outputs the measurement value Id of excitation current and the measurement value Iq of torque current to the current control unit 302.

At the time of activation of the motor 103, a detection unit 301 determines an initial phase of the rotor 502, that is, an electric angle at the time of stopping (hereinafter, stop angle) θ_std. For detection of the electric angle of the rotor 502 at the time of stopping, for example, the configuration described in US-2015-0145454 can be applied. In this case, the detection unit 301 detects the stop angle θ_std by detecting the inductance of the coils 213, 214, and 215 based on the current values Iu, Iv, and Iw, respectively. The detection unit 301 outputs the detected stop angle θ_std to a subtractor 307. An offset setting unit 304 outputs an offset amount Δ held by the nonvolatile memory 205 to the subtractor 307. The subtractor 307 outputs the electric angle obtained by subtracting the offset amount Δ from the stop angle θ_std to the angle calculation unit 303 as an initial angle θ_ini. The reason why the initial angle θ_ini is set to the electric angle obtained by subtracting the offset amount Δ from the stop angle θ_std is to suppress step-outs at the time of activation.

The angle calculation unit 303 obtains the electric angle θ_ref of the rotor 502 based on the initial angle θ_ini and a speed command value ω_ref input from the printer control unit 107, and notifies the coordinate conversion units 305 and 306 of the electric angle θ_ref. Specifically, the angle calculation unit 303 obtains the electric angle θ_ref of the rotor 502 by increasing the electric angle based on the speed command value ω_ref with the initial angle θ_ini as an initial value.

Figure 5:
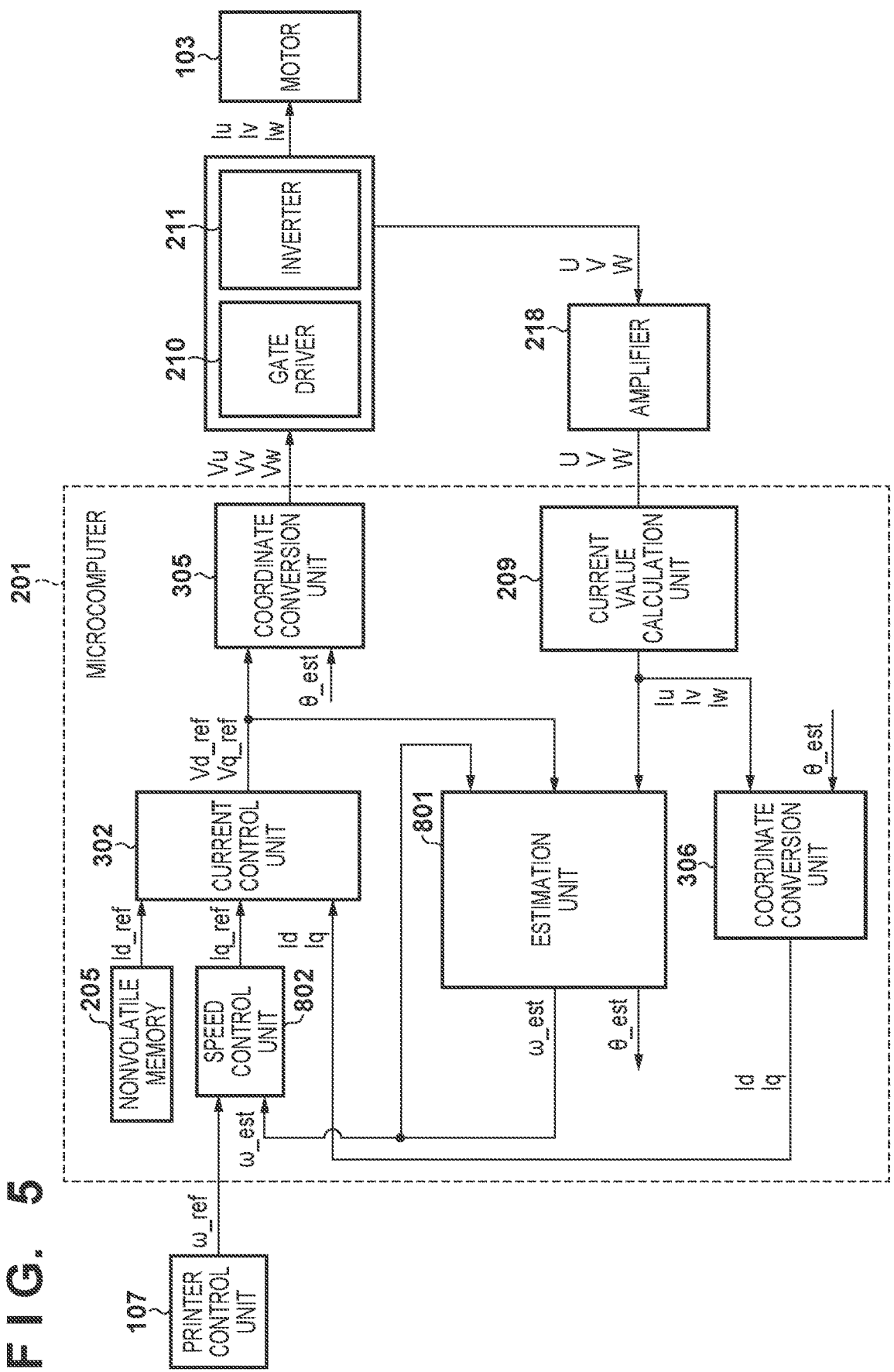
FIG. 5 is a functional block diagram of a microcomputer in sensorless control according to an embodiment.

FIG. 5 is a functional block diagram of the microcomputer 201 in sensorless control. Hereinafter, differences from the functional block diagram in the forced commutation control illustrated in FIG. 4 will be mainly described. An estimation unit 801 estimates an electric angle θ_est and rotation speed ω_est of the rotor 502, based on the current values Iu, Iv, and Iw, the voltage command values Vd_ref and Vq_ref, and the rotation speed ω_est estimated. The electric angle θ_est estimated is used for the coordinate conversion in the coordinate conversion units 305 and 306, as with the case of the forced commutation control. A speed control unit 802 calculates the command value Iq_ref for causing the rotation speed ω_est to follow the speed command value ω_ref, based on the speed command value ω_ref from the printer control unit 107 and the rotation speed ω_est estimated by the estimation unit 801. Unlike in forced commutation control, since the speed control unit 802 calculates the command value Iq_ref and outputs the calculated command value Iq_ref to the current control unit 302, and thus the current control unit 302 acquires and uses only the command value Id ref from the nonvolatile memory 205.

FIG. 6A illustrates a speed change of the motor 103 at the time of activation of the motor 103. The dotted line indicates a temporal change of the speed command value ω_ref. The motor control unit 110 starts rotation of the motor 103 by forced commutation control. Then, for example, at time Ta when the speed command value ω_ref reaches a threshold, the motor control unit 110 switches the control of the motor from the forced commutation control to the sensorless control. The sensorless control is applicable when the rotation speed of the motor 103 is equal to or higher than the threshold. Thereafter, the speed command value ω_ref increases to a target value and becomes constant at the target value. At and after the time Ta, the motor control unit 110 performs sensorless control of the motor 103 in accordance with the speed command value ω_ref. FIG. 6B illustrates a case where the activation of the motor 103 fails because the load of the motor 103 becomes too large due to the load fluctuation of the motor 103. In a case of a motor including a Hall element, when the load becomes heavy, the speed change at the time of activation only becomes gentle. However, in the forced commutation control for the motor 103 without the Hall element, step-out occurs when the load torque exceeds the output torque of the motor 103. The output torque of the motor 103 during forced commutation control is determined by the coil current during the forced commutation control, that is, the command value Id ref of the excitation current and the command value Iq_ref of the torque current. As described with reference to FIG. 4, the command value Id ref of the excitation current and the command value Iq_ref of the torque current during the forced commutation control are predetermined values stored in advance in the nonvolatile memory 205. The load torque of the motor 103 is the sum of the acceleration torque for accelerating the rotor 502 and the steady torque necessary for rotating the motor 103 at a constant speed.

FIG. 6C illustrates a speed change of the motor 103 when the increase rate of the speed command value ω_ref is made gentle as compared with those in FIGS. 6A and 6B. As illustrated in FIG. 6C, as compared with the cases of FIGS. 6A and 6B, the acceleration torque is reduced by controlling the acceleration of the motor 103 to be small, and it is possible to suppress step-out due to the sum of the acceleration torque and the steady torque exceeding the output torque. In FIG. 6C, the acceleration is stopped for a predetermined time period when the control is switched to the sensorless control. When the forced commutation control is switched to the sensorless control, the control of the motor 103 may become unstable, but it is possible to reduce the risk of activation failure by performing the switching with the acceleration torque being substantially 0. By activating as illustrated in FIG. 6C, it is possible to suppress the risk of step-out as compared with activating as illustrated in FIGS. 6A and 6B, but the time until the rotation speed of the motor 103 reaches the target speed, that is, the time until the activation of the motor 103 is completed becomes longer.

In the following description, the load of the motor 103 is assumed to be the photoreceptor 13. First, the load torque of the photoreceptor 13 will be described. As described above, the cleaning blade (photoreceptor cleaner) 14 is provided to remove the remaining toner of the photoreceptor 13. When the frictional force between the cleaning blade 14 and the photoreceptor 13 increases, the torque required to rotate the photoreceptor 13 increases. Therefore, the load torque of the motor 103 changes depending on the surface state of the photoreceptor 13 and the state of the toner existing between the photoreceptor 13 and the cleaning blade 14. For example, when the period during which printing is not performed becomes longer, the surface state of the photoreceptor 13 changes, and the frictional force with the cleaning blade 14 may increase. Therefore, activation failure may occur when activation is performed as illustrated in FIG. 6A after being left for a long time.

Therefore, in the present embodiment, a plurality of activation modes are provided. In the following description, the basic activation mode illustrated in FIG. 6A is referred to as "normal mode". On the other hand, as illustrated in FIG. 6C, the activation mode in which the motor 103 can be activated even when the load is heavy (large) by increasing the speed more gently than that in the basic mode is referred to as "high torque mode". The normal mode is a mode in which the activation time (time until the target speed is reached) is shorter than that in the high torque mode, but there is a high possibility that activation failure occurs when the load becomes heavy. On the contrary, the high torque mode is a mode in which the activation time is longer than that in the normal mode, but the possibility that activation failure will occur is low even if the load becomes heavy.

Figures 7, 8:
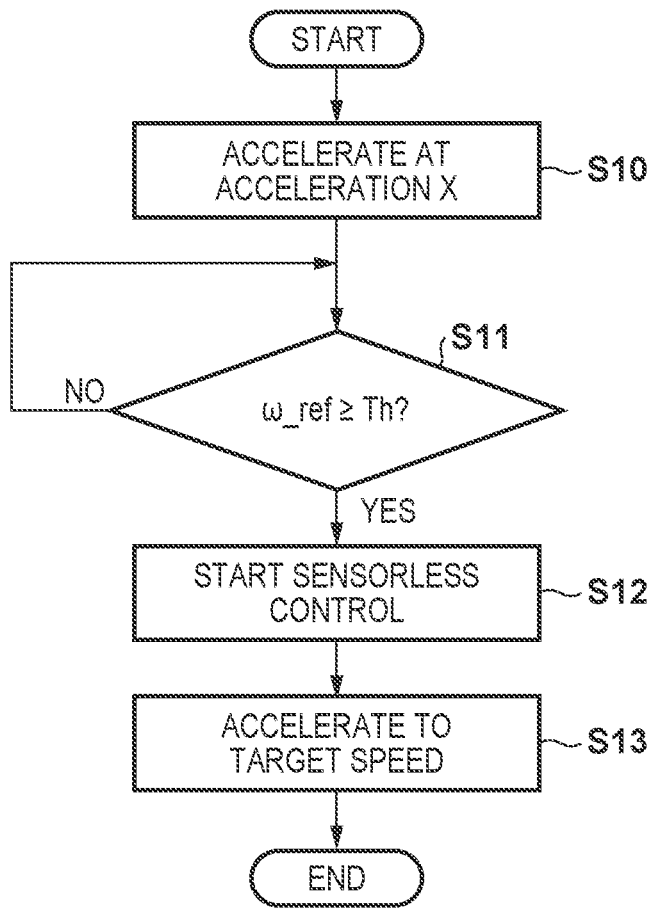
FIG. 7 is a diagram illustrating an example of information used to determine an activation mode to be used.
FIG. 8 is a flowchart of activation in a normal mode according to an embodiment.

When activating the motor 103, the printer control unit 107 determines whether or not the state of load satisfies a predetermined condition for determining that fluctuation in the magnitude of load has occurred. Then, the printer control unit 107 sets the high torque mode when the predetermined condition is satisfied, and sets the normal mode in other cases. FIG. 7 illustrates an example of the predetermined condition. The information illustrated in FIG. 7 is stored in advance in the nonvolatile memory 32a of the printer control unit 107. As illustrated in FIG. 7, the high torque mode is used in a case where after the motor is left for a predetermined time, that is, at the time of activating the motor 103, the stop time until then is longer than the predetermined time. At the first activation after replacement of the cartridge 12, the high torque mode is used because there is a possibility that the load torque is heavy. The replacement of the cartridge 12 includes replacement with a new cartridge 12 and replacement with another cartridge 12 already started to be used. The predetermined condition for determining whether or not to use the high torque mode is a condition for determining whether or not the load torque fluctuates, more specifically, whether or not there is a possibility that the load has become heavier (greater) than a reference value, and the predetermined condition may include a condition other than that illustrated in FIG. 7. The acceleration of the motor 103 at the time of activation in the normal mode may be determined based on the reference value of the load. The printer control unit 107 sets the activation mode to the high torque mode when a predetermined condition for using the high torque mode is satisfied, and sets the activation mode to the normal mode when the predetermined condition is not satisfied.

FIG. 8 is a flowchart of the motor activation processing when the normal mode is set. The motor control unit 110 performs forced commutation control on the motor 103 with acceleration X in S10. That is, the printer control unit 107 increases the speed command value $\omega\_ref$ in accordance with the acceleration X. When the speed command value $\omega\_ref$ becomes equal to or higher than a threshold Th in S11, the motor control unit 110 switches to the sensorless control in S12. Thereafter, the printer control unit 107 accelerates the motor 103 with the acceleration X toward the target speed, and makes the speed command value $\omega\_ref$ constant at the target value when the speed command value $\omega\_ref$ reaches the target value.

Figure 9:
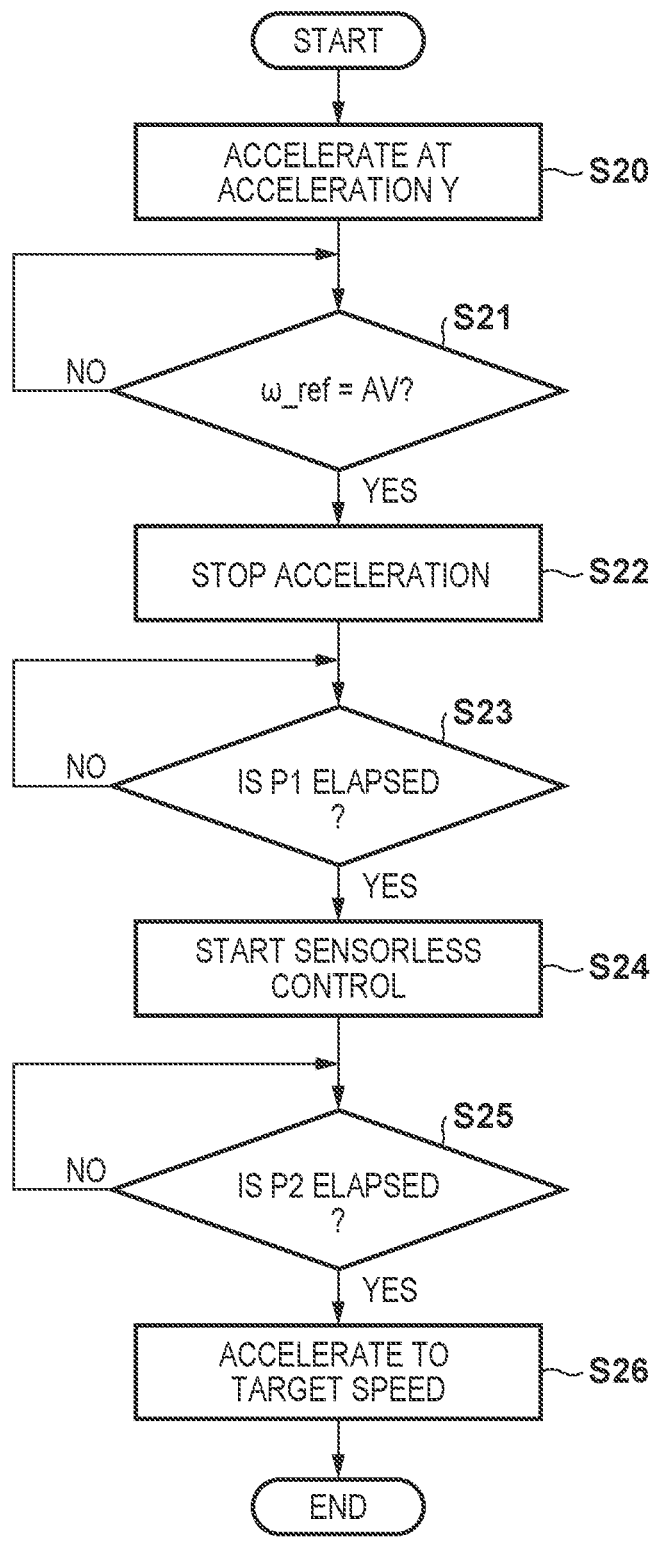
FIG. 9 is a flowchart of activation in a high torque mode according to an embodiment.

FIG. 9 is a flowchart of the motor activation processing when the high torque mode is set. The motor control unit 110 performs forced commutation control on the motor 103 with acceleration Y in S20. That is, the printer control unit 107 increases the speed command value $\omega\_ref$ in accordance with the acceleration Y. The acceleration Y is smaller than the acceleration X used in the normal mode. When the speed command value $\omega\_ref$ reaches a predetermined value AV in S21, the printer control unit 107 stops the acceleration in S22, that is, makes the speed command value $\omega\_ref$ constant at the predetermined value AV. The predetermined value AV is a value at which sensorless control becomes possible, that is, a value equal to or higher than the threshold Th. After waiting for a period P1 in S23, the motor control unit 110 switches to the sensorless control in S24. Thereafter, after waiting for a period P2 in S25, the printer control unit 107 accelerates the motor 103 with the acceleration Y toward the target speed in S26, and makes the speed command value $\omega\_ref$ constant at the target value when the speed command value $\omega\_ref$ reaches the target value. The period P1 and the period P2 may be the same period or different periods. As an example, the period P1 and the period P2 are 100 milliseconds.

In the processing of FIG. 9, the printer control unit 107 has stopped the acceleration when switching from the forced commutation control to the sensorless control (S22). This is because, as described above, since the control may become unstable when the forced commutation control is switched to the sensorless control, the acceleration torque is set to substantially 0 to reduce the load torque. However, a configuration of not stopping the acceleration but changing to acceleration Z smaller than the acceleration Y, and switching to the sensorless control while accelerating with the acceleration Z may be adopted. Furthermore, a configuration of switching to the sensorless control while the acceleration Y is maintained may be adopted.

In the processing of FIG. 9, after switching to the sensorless control, the printer control unit 107 accelerates the motor 103 with the acceleration Y. However, after the control is switched to the sensorless control, a configuration of accelerating the motor 103 with acceleration greater than the acceleration Y, for example, the acceleration X same as that in the normal mode may be adopted. Furthermore, although the acceleration X is used in the normal mode and the acceleration Y is used in the high torque mode, the present invention is not limited to accelerating the motor 103 with constant acceleration. That is, the acceleration X and the acceleration Y may be functions of time. In this case, the maximum value of the acceleration Y may be configured to be smaller than the maximum value of the acceleration X. Alternatively, the maximum value of the acceleration Y may be configured to be smaller than the minimum value or the average value of the acceleration X. Furthermore, the average value of the acceleration Y may be configured to be smaller than the average value of the acceleration X.

As described above, in a case where it is determined that there is a possibility that the load has become heavier than the reference value, the acceleration torque is made small by making the speed increase at the time of activation gentle as compared with a case where it is determined otherwise. This configuration can suppress occurrence of activation failure.

In the present embodiment, the load of the motor 103 is the photoreceptor 13. However, the present invention may be applied to control of any motor in which the weight of load may fluctuate, and the load of the motor is not limited to the photoreceptor 13. It may also be configured such that a condition for determining the weight of the load is set, and based on the condition, when it is determined that the load has become heavier than the reference value, the high torque mode is used and otherwise the normal mode is used. Furthermore, it may be configured such that the weight of the load is determined, and when the load has become heavier than the reference value, the high torque mode is used, and otherwise the normal mode is used.

Second Embodiment

Figure 10:
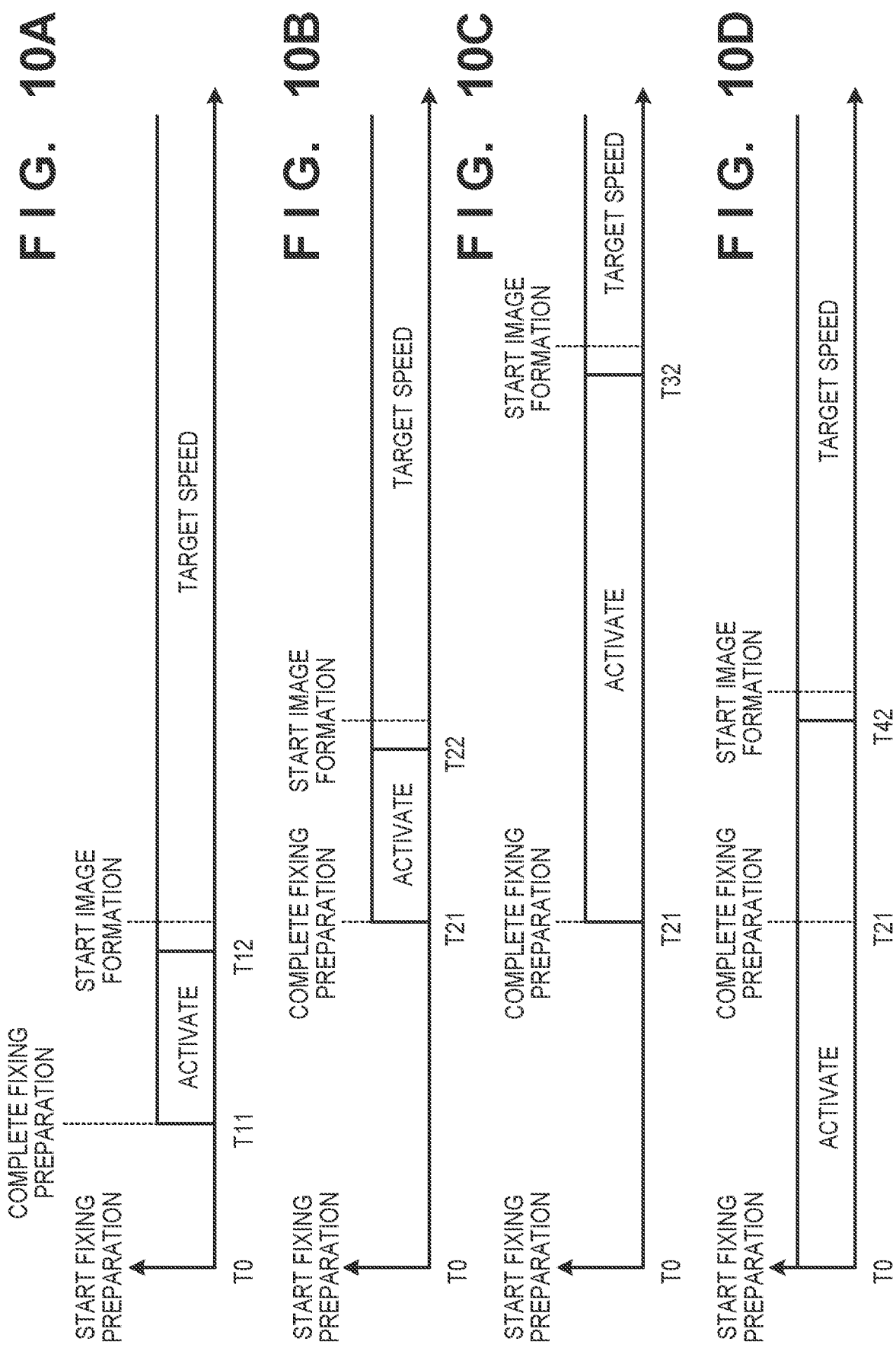
FIGS. 10A to 10D are time charts at the time of motor activation according to an embodiment.

Next, a second embodiment will be explained mainly on differences from the first embodiment. FIGS. 10A and 10B are timing charts at the time of activation in the normal mode. Time T0 in FIGS. 10A to 10D corresponds to the timing at which the image forming apparatus receives a print job. FIG. 10A illustrates a case where the fixing unit 30 is in a state of being warmed to some extent (hereinafter, referred to as warm state) at the time T0. On the other hand, FIG. 10B illustrates a case where the fixing unit 30 is in a state where the temperature is lower than that in the warm state (hereinafter, referred to as cold state) at the time T0. The printer control unit 107 can determine whether the fixing unit 30 is in the cold state or the warm state based on a measurement result of a temperature sensor provided in the fixing unit 30, for example. Specifically, it may be determined that the fixing unit 30 is in the warm state when the measurement result of the temperature sensor indicates that the temperature is higher than a predetermined temperature, and it may be determined that the fixing unit 30 is in the cold state in other cases. The printer control unit 107 can determine whether it is in the cold state or the warm state based on the elapsed time from the completion timing of the previous print job. Specifically, it may be determined to be in the warm state when the elapsed time from the completion timing of the previous print job is longer than a predetermined time, and it may be determined to be in the cold state in other cases.

Upon receiving the print job at the time T0, the printer control unit 107 performs various preparation processing for image formation. This preparation processing includes fixing preparation processing of increasing a temperature of the fixing unit 30 to a predetermined fixing temperature. That is, upon receiving the print job, the printer control unit 107 starts temperature control of the fixing unit 30. When warm-up of the fixing unit 30 is completed (fixing preparation is completed), the printer control unit 107 starts the activation of the motor 103. For example, when the temperature of the fixing unit 30 reaches a predetermined temperature, the printer control unit 107 determines that the fixing preparation is completed. The predetermined temperature of the fixing unit 30 at which the fixing preparation is determined to be completed can be made lower than the fixing temperature at the time of performing the fixing processing by the fixing unit 30. This is because it is sufficient that the fixing unit 30 has reached the fixing temperature when the sheet to which the toner image has been transferred reaches the fixing unit 30. The predetermined temperature does not need to be a constant temperature. For example, the fixing temperature may be controlled according to the type of sheet. Therefore, the predetermined temperature at which the fixing preparation is determined to be completed may be determined based on necessary fixing temperature.

In FIG. 10A, the fixing preparation is completed at time T11, and thus, the printer control unit 107 starts the activation of the motor 103 at the time T11. Then, at time T12, the activation of the motor 103 is completed, that is, the speed of the motor 103 becomes the target speed. The printer control unit 107 starts image formation after a predetermined period from the timing at which the activation of the motor 103 is completed. On the other hand, in FIG. 10B, since the fixing unit 30 is in the cold state at the time T0, the time until the fixing preparation is completed becomes longer as compared with the case of FIG. 10A that is in the warm state, and the fixing preparation is completed at time T21 later than the time T11. The time required for the activation of the motor is similar to that in the case of FIG. 10A, but since the time required for preparing the fixing unit 30 is longer than that in FIG. 10A, in the case of FIG. 10B, time T22 when the activation of the motor 103 is completed is later than that in the case of FIG. 10A. Thus, when the fixing unit 30 is in the cold state, the period from the reception of the print job to being ready to start image formation becomes long, and thus the period from the reception of the print job to output of the sheet on which the image is formed also becomes long. The motor 103 is activated after the fixing preparation is completed in order to shorten the rotation time of the photoreceptor 13 and prolong the life of the photoreceptor 13.

FIG. 10C is a timing chart in a case where the motor 103 is activated in the high torque mode by the sequence similar to those in FIGS. 10A and 10B. Here, it is assumed that the fixing unit 30 is in the cold state at the time T0. The timing at which the preparation of the fixing unit 30 is completed is the time T21 similarly to the case of FIG. 10B. However, since the acceleration of the motor 103 in the high torque mode is made lower than the acceleration in the normal mode, the activation time of the motor 103 is longer than that in the normal mode. In FIG. 10C, the activation of the motor 103 is completed at time T32 later than time T22. Therefore, the time from the reception of the print job to the start of image formation becomes longer than that in the case of FIG. 10B.

Therefore, in the present embodiment, when the fixing unit 30 is in the cold state at the time of reception of the print job and the motor 103 needs to be activated in the high torque mode, the printer control unit 107 starts the activation of the motor 103 simultaneously with the start of the fixing preparation as illustrated in FIG. 10D. In the example of FIG. 10D, the activation of the motor 103 is completed at time T42 earlier than the time T32. The difference between the time T32 and the time T42 corresponds to the difference between the time T0 and the time T21. This configuration can quickly complete the activation of the motor 103. Therefore, the period from the reception of the print job to the start timing of the image formation and the period from the reception of the print job to the timing at which the image forming apparatus outputs the sheet on which the image is formed can be suppressed from becoming too long.

Figure 11:
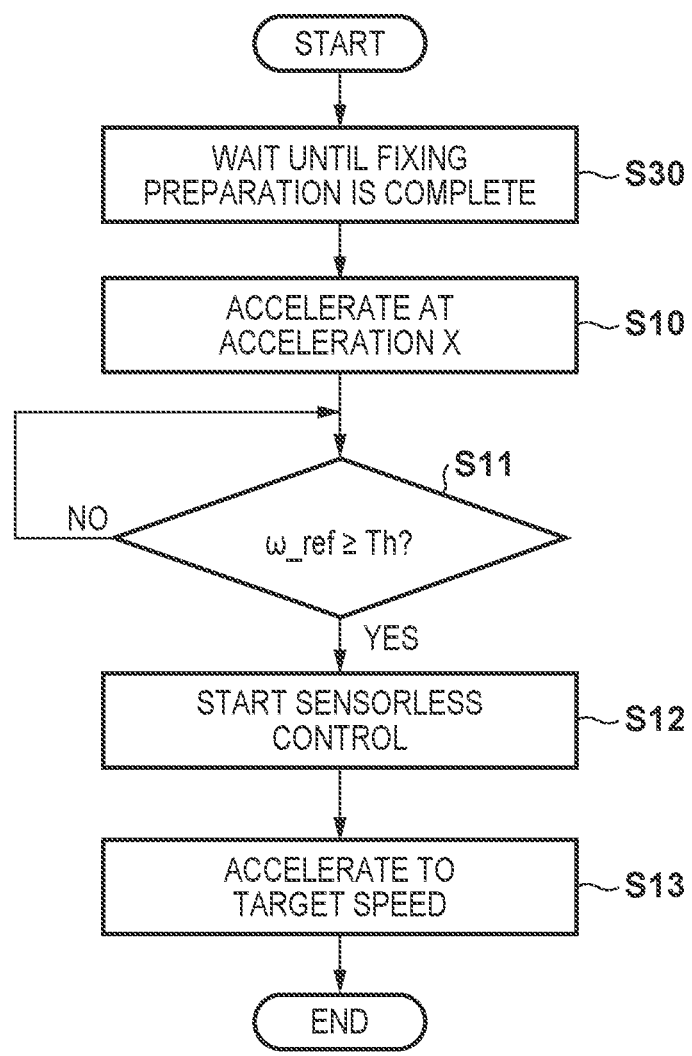
FIG. 11 is a flowchart of activation in a normal mode according to an embodiment.
Figure 12:
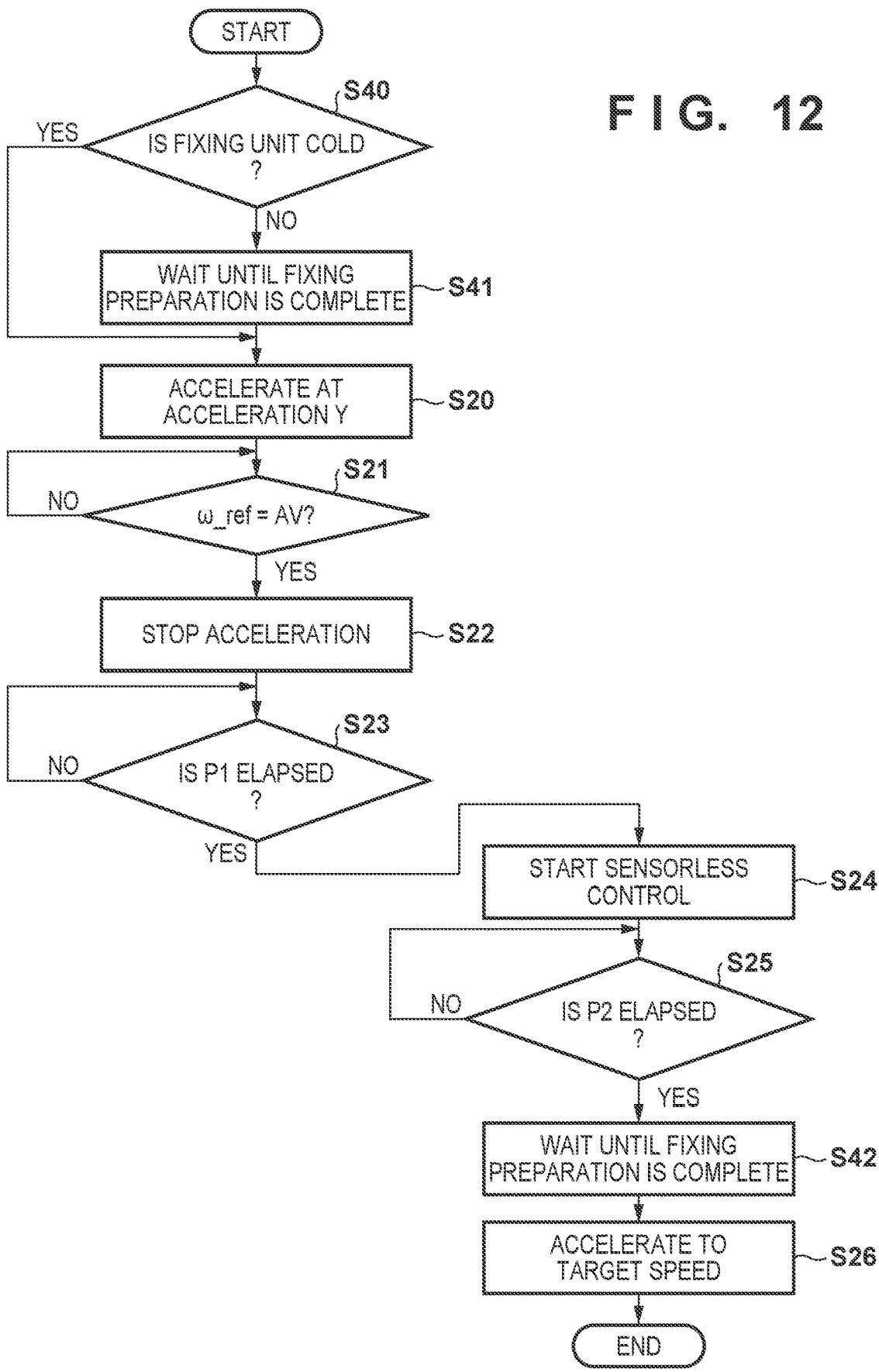
FIG. 12 is a flowchart of activation in a high torque mode according to an embodiment.

FIGS. 11 and 12 are flowcharts of processing executed by the printer control unit 107 when receiving the print job. FIG. 11 illustrates a case where the motor 103 is activated in the normal mode, and FIG. 12 illustrates a case where the motor 103 is activated in the high torque mode. The same step numbers are given to the same processing steps as those in the flowcharts of FIGS. 8 and 9, and description thereof will be omitted.

In the case of activation in the normal mode, upon receiving the print job, the printer control unit 107 starts the fixing preparation in S30 and waits until the fixing preparation is completed. When the fixing preparation is completed, the printer control unit 107 performs processing similar to that of the flowchart of FIG. 8. On the other hand, in the case of activation in the high torque mode, upon receiving the print job, the printer control unit 107 determines whether or not the fixing unit 30 is in the cold state in S40. When the fixing unit 30 is not in the cold state, the printer control unit 107 waits until the fixing preparation is completed in S41, and when the fixing preparation is completed, starts the activation of the motor 103 with the acceleration Yin S20. On the other hand, when the fixing unit 30 is in the cold state in S40, the printer control unit 107 starts the activation of the motor 103 with the acceleration Yin S20 simultaneously with the start of the fixing preparation.

The printer control unit 107 determines whether the fixing preparation is completed in S42 before S26, and re-accelerates the motor 103 in S26 after the fixing preparation is completed. This is to prevent the image formation to be started in a case of Yes in S40 and the activation of the motor 103 being completed without the completion of the fixing preparation.

In the present embodiment, in a case where the high torque mode is required, when the fixing unit 30 is in the warm state at the time of reception of the print job, the activation of the motor 103 is started after the completion of the fixing preparation. However, in the case of the high torque mode, it is also possible to adopt a configuration in which the activation of the motor 103 is always started simultaneously with the start of the fixing preparation. Furthermore, in the case of the high torque mode, it is also possible not to adopt a configuration in which the activation of the motor 103 is started simultaneously with the start of the fixing preparation, but to adopt a configuration in which the activation of the motor 103 is started before the completion of the fixing preparation. That is, in the case of the high torque mode, a configuration may be adopted in which the timing to start the activation of the motor 103 can be made earlier than that in the normal mode.

In the present embodiment, the load of the motor 103 is the photoreceptor 13. However, the present embodiment can be applied also to other loads for which an activation start timing is controlled depending on the state of the fixing unit 30. For example, the present embodiment can be applied to a case where any member of the image forming unit including the cartridge 12 that forms an image on a sheet and the intermediate transfer belt 19 is used as a load.

<Additional Notes>

Note that in each of the above-described embodiments, the motor control unit 110 is described as a component of the image forming apparatus, but the motor control unit 110 can be a motor control apparatus as one apparatus. Additionally, an apparatus including the printer control unit 107 and the motor control unit 110 can be a motor control apparatus. The present invention can be applied to control of a motor that drives a discretionary member such as a motor that drives an image forming unit related to image formation such as the cartridge 12 and the intermediate transfer belt 19 and a motor that drives a roller (rotating member) configured to convey the sheet 21. As an example, the load of the motor 103 may be one or more of the photoreceptor 13, the developing roller 16, the intermediate transfer belt 19, the pressurizing roller of the fixing unit 30, and the roller configured to convey the sheet 21. The configuration of the motor 103 is not limited to the configuration illustrated in FIG. 3, and may be a motor having another number of poles or phases. Furthermore, the high torque mode can have a plurality of stages according to the output torque estimated to be necessary. For example, it is possible to provide a first high torque mode to a third high torque mode. The first high torque mode to the third high torque mode have different accelerations at the time of activation.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-010360, filed Jan. 26, 2022, which is hereby incorporated by reference herein in its entirety.

What is claimed is:

1. A motor control apparatus comprising:
a motor configured to drive a load; and
a control unit configured to control the motor, wherein
the control unit is configured to, when activating the motor, determine whether a predetermined condition for determining that fluctuation in magnitude of the load occurs is satisfied, activate the motor in a first mode when the predetermined condition is satisfied, and activate the motor in a second mode when the predetermined condition is not satisfied, and
the first mode is a mode in which an increase in rotation speed of the motor is gentler than an increase in rotation speed of the motor in the second mode.

2. A motor control apparatus comprising:
a motor configured to drive a load; and
a control unit configured to control the motor,
the motor control apparatus configured to activate the motor in a first mode or a second mode, wherein
load torque of the motor in the second mode is greater than load torque of the motor in the first mode, and
the first mode is a mode in which an increase in rotation speed of the motor is gentler than an increase in rotation speed of the motor in the second mode.

3. The motor control apparatus according to claim 1, wherein the control unit is further configured such that, in a case where the motor is activated in the first mode, the motor is accelerated with first acceleration by first control until a rotation speed of the motor reaches a predetermined value, and when the rotation speed of the motor becomes the predetermined value, control of the motor is switched from the first control to second control after acceleration of the motor is stopped or after the acceleration of the motor is changed to second acceleration lower than the first acceleration.

4. The motor control apparatus according to claim 3, wherein the control unit is further configured to, after switching the control of the motor from the first control to the second control, re-accelerate the motor until the rotation speed of the motor reaches a target value.

5. The motor control apparatus according to claim 3, wherein
the second control is applicable to a case where the rotation speed of the motor is equal to or higher than a threshold, and
the predetermined value is equal to or higher than the threshold.

6. The motor control apparatus according to claim 5, wherein the control unit is further configured such that, in a case where the motor is activated in the second mode, the motor is accelerated by the first control with third acceleration higher than the first acceleration, and when the rotation speed of the motor becomes equal to or higher than the threshold, the control of the motor is switched from the first control to the second control.

7. The motor control apparatus according to claim 3, wherein
the second control is control based on an induced voltage generated in the motor, and
the first control is control not based on an induced voltage generated in the motor.

8. The motor control apparatus according to claim 7, wherein the first control is forced commutation control.

9. The motor control apparatus according to claim 1, wherein the predetermined condition, when the motor is activated, is satisfied in a case where a stop time of the motor until the activation of the motor is greater than a predetermined time.

10. The motor control apparatus according to claim 1, wherein the predetermined condition is satisfied in a case of an initial activation of the motor after the load of the motor is replaced.

11. The motor control apparatus according to claim 1, wherein the motor is a sensorless motor not including a sensor that detects a rotation position of a rotor.

12. The motor control apparatus according to claim 1, wherein the load includes at least one of a photoreceptor of an image forming apparatus, a developing roller that forms a toner image on the photoreceptor by developing an electrostatic latent image formed on the photoreceptor, an intermediate transfer belt to which the toner image formed on the photoreceptor is transferred, a roller that fixes, to a sheet, the toner image transferred from the intermediate transfer belt to the sheet, and a roller that conveys the sheet.

13. An image forming apparatus comprising:
a rotation member configured to convey a sheet along a conveyance path;
an image forming unit configured to form an image on the sheet conveyed through the conveyance path;
a motor configured to drive the rotation member or the image forming unit; and
a control unit configured to, when activating the motor, determine whether a predetermined condition for determining that fluctuation in magnitude of a load of the motor occurs is satisfied, activate the motor in a first mode when the predetermined condition is satisfied, and activate the motor in a second mode when the predetermined condition is not satisfied, wherein
the first mode is a mode in which an increase in rotation speed of the motor is gentler than an increase in rotation speed of the motor in the second mode.

14. The image forming apparatus according to claim 13 further comprising: a fixing unit configured to fix the image on the sheet on which the image is formed by the image forming unit, wherein
the motor drives the image forming unit, and
the control unit is further configured to, upon receiving a print job, start temperature control of the fixing unit, activate the motor in the second mode at a first timing after starting the temperature control in a case where the predetermined condition is not satisfied when the print job is received, and
activate the motor in the first mode at a second timing before the first timing in a case where the predetermined condition is satisfied when the print job is received.

15. The image forming apparatus according to claim 14, wherein the second timing is a timing to start the temperature control of the fixing unit.

16. The image forming apparatus according to claim 14, wherein the control unit, when receiving the print job, determines a state of the fixing unit, and
activates the motor in the first mode at the second timing in a case where the predetermined condition is satisfied and a state of the fixing unit is a first state.

17. The image forming apparatus according to claim 16, wherein the control unit is further configured to, when receiving the print job, activate the motor in the first mode at a third timing later than the second timing in a case where the predetermined condition is satisfied and the fixing unit is in a second state different from the first state.

18. The image forming apparatus according to claim 17, wherein the fixing unit in the first state is in a state of being lower in temperature than the fixing unit in the second state.

19. The image forming apparatus according to claim 14, wherein the first timing is a timing at which temperature of the fixing unit becomes a predetermined temperature.

* * * * *